United States Patent
Wang et al.

(10) Patent No.: US 12,223,008 B2
(45) Date of Patent: **\*Feb. 11, 2025**

(54) TAMPER-PROOF INTERACTION DATA

(71) Applicant: Google LLC, Mountain View, CA (US)

(72) Inventors: Gang Wang, Frederick, MD (US); Alex Daniel Jacobson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,345

(22) Filed: Oct. 26, 2023

(65) Prior Publication Data

US 2024/0054173 A1 Feb. 15, 2024

Related U.S. Application Data

(63) Continuation of application No. 17/419,604, filed as application No. PCT/US2020/034252 on May 22, 2020, now Pat. No. 11,836,209.

(51) Int. Cl.
G06F 16/95 (2019.01)
G06F 3/048 (2013.01)
(Continued)

(52) U.S. Cl.
CPC .......... G06F 16/9577 (2019.01); G06F 3/048 (2013.01); G06F 3/0481 (2013.01);
(Continued)

(58) Field of Classification Search
None
See application file for complete search history.

(56) References Cited

U.S. PATENT DOCUMENTS 8,185,830 B2 * 5/2012 Saha .................... G06F 16/958
715/764
8,667,417 B1 3/2014 Goodger et al.
(Continued)

FOREIGN PATENT DOCUMENTS

CN 102142016 8/2011
CN 109789337 5/2019

OTHER PUBLICATIONS

International Preliminary Report on Patentability in International Appln. No. PCT/US2020/034252, mailed on Dec. 1, 2022, 8 pages.
(Continued)

*Primary Examiner* — Maikhanh Nguyen
(74) *Attorney, Agent, or Firm* — Fish & Richardson P.C.

(57) ABSTRACT

Methods, systems, and apparatus, including computer programs encoded on a computer storage medium, for validating interactions with false rendered elements. In one aspect, a method includes receiving a rendering notification and a declaration of a rendered element defined in an active window on a client device, detecting interaction with the rendered element at the client device, determining whether the interaction occurred at a declared location of the rendered element within the active window, and processing the interaction including: in response to determining that the interaction occurred: capturing a screenshot of the active window on the client device; verifying a visual appearance of the rendered element in the screenshot with a declared appearance of the rendered element, and generating an interaction attestation, thereby validating the interaction. In response to determining that the interaction did not occur, refraining from generating the interaction attestation.

20 Claims, 5 Drawing Sheets

(51) Int. Cl.
*G06F 3/0481* (2022.01)
*G06F 16/955* (2019.01)
*G06F 16/957* (2019.01)
*G06F 16/958* (2019.01)

(52) U.S. Cl.
CPC ...... *G06F 16/9566* (2019.01); *G06F 16/9574* (2019.01); *G06F 16/958* (2019.01)

(56) References Cited

U.S. PATENT DOCUMENTS

| | | | |
|---|---|---|---|
| 8,671,389 | B1 | 3/2014 | Buryak et al. |
| 9,588,636 | B1 | 3/2017 | Choc et al. |
| 9,607,332 | B1 | 3/2017 | Nazazrov et al. |
| 9,853,996 | B2 | 12/2017 | Eliyahu et al. |
| 10,223,742 | B2 | 3/2019 | Arora et al. |
| 10,679,244 | B1 | 6/2020 | Bhowmick et al. |
| 10,679,250 | B2 * | 6/2020 | Pattan ................... H04L 67/535 |
| 11,048,614 | B2 * | 6/2021 | Zhang ................. G06F 11/3644 |
| 11,086,741 | B2 * | 8/2021 | Zhang ................. G06F 11/3664 |
| 11,423,438 | B2 * | 8/2022 | Barton ................... H04L 63/083 |
| 2007/0300178 | A1 | 12/2007 | McArdle |
| 2009/0292924 | A1 | 11/2009 | Johnson et al. |
| 2011/0113388 | A1 | 5/2011 | Eisen et al. |
| 2014/0049462 | A1 * | 2/2014 | Weinberger ............. G06F 3/013 345/156 |
| 2014/0115701 | A1 * | 4/2014 | Moshchuk .............. G06F 21/51 726/23 |
| 2015/0207852 | A1 | 7/2015 | Boodman et al. |
| 2015/0222512 | A1 | 8/2015 | Kay et al. |
| 2015/0242885 | A1 * | 8/2015 | Alsina ................ G06Q 30/0244 705/14.43 |
| 2018/0198807 | A1 | 7/2018 | Johns et al. |
| 2018/0324208 | A1 | 11/2018 | Eliyahu et al. |
| 2019/0303976 | A1 * | 10/2019 | Wöhle ................ G06Q 30/0271 |
| 2020/0026536 | A1 | 1/2020 | Li et al. |
| 2022/0122121 | A1 | 4/2022 | Wang et al. |

OTHER PUBLICATIONS

International Search Report and Written Opinion in International Appln. No. PCT/US2020/034252, mailed on Jan. 22, 2021, 14 pages.
Notice of Allowance in Japanese Appln. No. 2021-541482, mailed on Sep. 20, 2022, 5 pages (with English translation).
Notice of Allowance in Korean Appln. No. 10-2021-7022220, mailed on Feb. 13, 2023, 3 pages (with English Translation).
Office Action in Korean Appln. No. 10-2021-7022220, mailed on Oct. 3, 2022, 13 pages (with English translation).
Extended European Search Report in European Appln. No. 24188157.2, mailed on Oct. 10, 2024, 9 pages.
Office Action in Chinese Appln. No. 202080009331.1, mailed on Dec. 5, 2024, 10 pages ( with English translation).

* cited by examiner

TAMPER-PROOF INTERACTION DATA

CROSS-REFERENCE TO RELATED APPLICATIONS

This application is a continuation application of, and claims priority to, U.S. patent application Ser. No. 17/419,604, filed on Jun. 29, 2021 (now U.S. Pat. No. 11,836,209), which is a National Stage Application under 35 U.S.C. § 371 and claims the benefit of International Application No. PCT/US2020/034252, filed May 22, 2020. The entirety of each foregoing application is incorporated herein by reference in its entirety for all purposes.

BACKGROUND

Programmatic clicks can lead to the widespread distribution of false information which significantly deteriorates users' online experience and wastes computing resources that could otherwise be used to distribute accurate information.

SUMMARY

This specification describes technologies relating to data processing, and generating non-falsifiable attestation tokens to verify human interaction with content while protecting user privacy.

In general, one innovative aspect of the subject matter described in this specification can be embodied in methods that include the actions of receiving a rendering notification of a rendered element defined in an active window on a client device, receiving a declaration of the rendered element defined in the active window on the client device, detecting interaction with the rendered element at the client device, determining, based on the received declaration, whether the interaction occurred at a declared location of the rendered element within the active window, and processing the interaction based on the determination of whether the interaction occurred at the declared location. Processing the interaction includes: in response to determining that the interaction occurred at the declared location of the rendered element: capturing a screenshot of the active window on the client device, verifying a visual appearance of the rendered element in the screenshot with a declared appearance of the rendered element, and generating an interaction attestation for the interaction with the rendered element, thereby validating the interaction. In response to determining that the interaction did not occur at the declared location of the rendered element, refraining from generating the interaction attestation for the interaction with the rendered element.

Other embodiments of this aspect include corresponding systems, apparatus, and computer programs, configured to perform the actions of the methods, encoded on computer storage devices.

These and other embodiments can each optionally include one or more of the following features. In some implementations, the rendering notification includes one or more of i) a location of the rendered element in the active window, ii) a stable ID and URI of the rendered element and iii) a site or domain that rendered the rendered element.

In some implementations, receiving the declaration of the rendered element includes receiving a verified appearance of the rendered element. The verified appearance can include a unique stable ID and/or stable URL and a verified shape.

In some implementations, verifying a visual appearance of the rendered element in the screenshot with a declared appearance of the rendered element includes utilizing an image matching algorithm.

In some implementations, detecting the interaction includes receiving a selection signal specifying an XY coordinate of a user click within the active window.

In some implementations, the methods further include aggregating the interaction attestations for multiple interactions with multiple instantiations of the rendered element. The interaction attestation can include one or more of i) a stable ID and/or URI of the declared appearance, ii) a timestamp of the interaction, iii) a device integrity token, iv) a digital signature by the client device, v) XY coordinates of the interaction, and vi) a client device public key. The stable ID and/or URI of the declared appearance can include a user intent of the interaction, where the user intent can correspond to an action conveyed by the appearance of the rendered element.

In some implementations, the methods further include: in response to the interaction attestation including a user intent, modifying a report of the interaction based on the user intent. The methods can further include: in response to determining that the interaction is different to the user intent, determining that the rendered element is a false rendered element and triggering a false interaction response. The methods can further include, in response to triggering the false interaction response, intercepting the pathway of the client device to a landing page of the false rendered element.

In some implementations, in response to determining that the interaction did not occur at the declared location of the rendered element, the methods include triggering a false interaction response.

Particular embodiments of the subject matter described in this specification can be implemented so as to realize one or more of the following advantages. Verifying that a real user has interacted with a rendered element, e.g., a button, a thumbs up/down, etc., at a remote client device can preserve the authenticity of a ranking mechanism for a digital component, e.g., a news article, and prevent bad actors from manipulating a ranked set of digital components. By validating the appearance of a rendered component at a remote client device using third-party validation, the system can ensure that an actual user is interacting with the intended rendered element, e.g., button, rather than a hidden or manipulated element that may be trying to launch a secondary action or hijack the interaction altogether. This subject matter can be utilized to rapidly identify fake rendered elements distributed through an online system using validated attestation tokens that preserve user privacy. Using the validated attestation tokens, the system can ensure that a detected interaction was performed at a remote client device by an actual user, and that the user was actually provided the content at the time of the detected interaction. This type of verification uses verifiable digital signatures created by one or more devices and which cannot be falsified by a human operator to validate interactions with content at remote client devices.

By ensuring that the rendered user interface (UI) elements being processed are valid prior to the processing of secondary actions, e.g., linking to a landing page, adjusting underlying ranking mechanisms associated with the rendered element, etc., the processing, memory, and resources being used to provide content to end-users is reduced because resources are not being utilized to store, distribute, or present false information associated with the fake rendered elements. Additionally, using attestation tokens can assist in classifying rendered elements presented with digital components as false in a more reliable and efficient manner, reducing the resources required to store and distribute misleading information. For example, the attestation tokens are configured to ensure that the interactions with the rendered elements are made by users that were actually exposed to and/or clicked on actually rendered elements, while still preserving the user's privacy. As such, the interactions can be confirmed to be legitimate rather than being made by malicious actors (e.g., entities trying to harm a particular content distributor). As such, resources are not wasted processing illegitimate false rendered element alerts, and the resulting metrics and/or reports providing information about digital components that contain false rendered elements are made more accurate and are more efficiently created because of the ability to validate each rendered element as legitimate or illegitimate using the attestation tokens. Furthermore, the techniques described throughout this document enable systems to warn users when they are being presented with content that may be false or misleading, thereby providing the users with the ability to avoid misleading or malicious content.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

In general, this document relates to computer implemented methods and systems to validate interactions with false rendered elements, e.g., misleading and/or invisible buttons, presented with digital components, e.g., video clips, audio clips, multimedia clips, images, text, or another unit of content, using verified rendered element appearance and interaction attestation. A user's interaction with a rendered element in an active window on a client device, e.g., in an application environment or website, can be reported by the operating system or other trusted application or web browser, along with information related to the appearance of the rendered element in the active window, e.g., a screenshot of the active window. The appearance of the rendered elements can be verified by a third party and include a declaration of appearance accessible by the application and/or web browser presenting the rendered element. The rendered element can be validated using the third party declaration of the appearance of the rendered element and a screenshot of the active window of the client device, to verify that the interaction by the user was intentional. Validating the interaction as a human interaction (rather than an automated, or bot, interaction) and the rendered element as not a false rendered element can limit, modify, or halt false rendered elements from being used to distribute digital components that present false information, as discussed throughout this document.

Operating systems (OS), e.g., for applications, and browsers can validate user interactions with rendered elements in a privacy-preserving manner, such that the false rendered elements can be identified using a central aggregation server (s) that implements privacy-preserving aggregation measurements. Aggregated false rendered element reports can be generated from the validated user interactions with the rendered elements, which can be utilized to alert a user to potential false rendered elements present in an active window on the client device. Systems and methods for validating user interaction with rendered elements are described in further detail below with reference to FIGS. 2A, 2B, and 3.

Example Operating Environment

Figure 1:
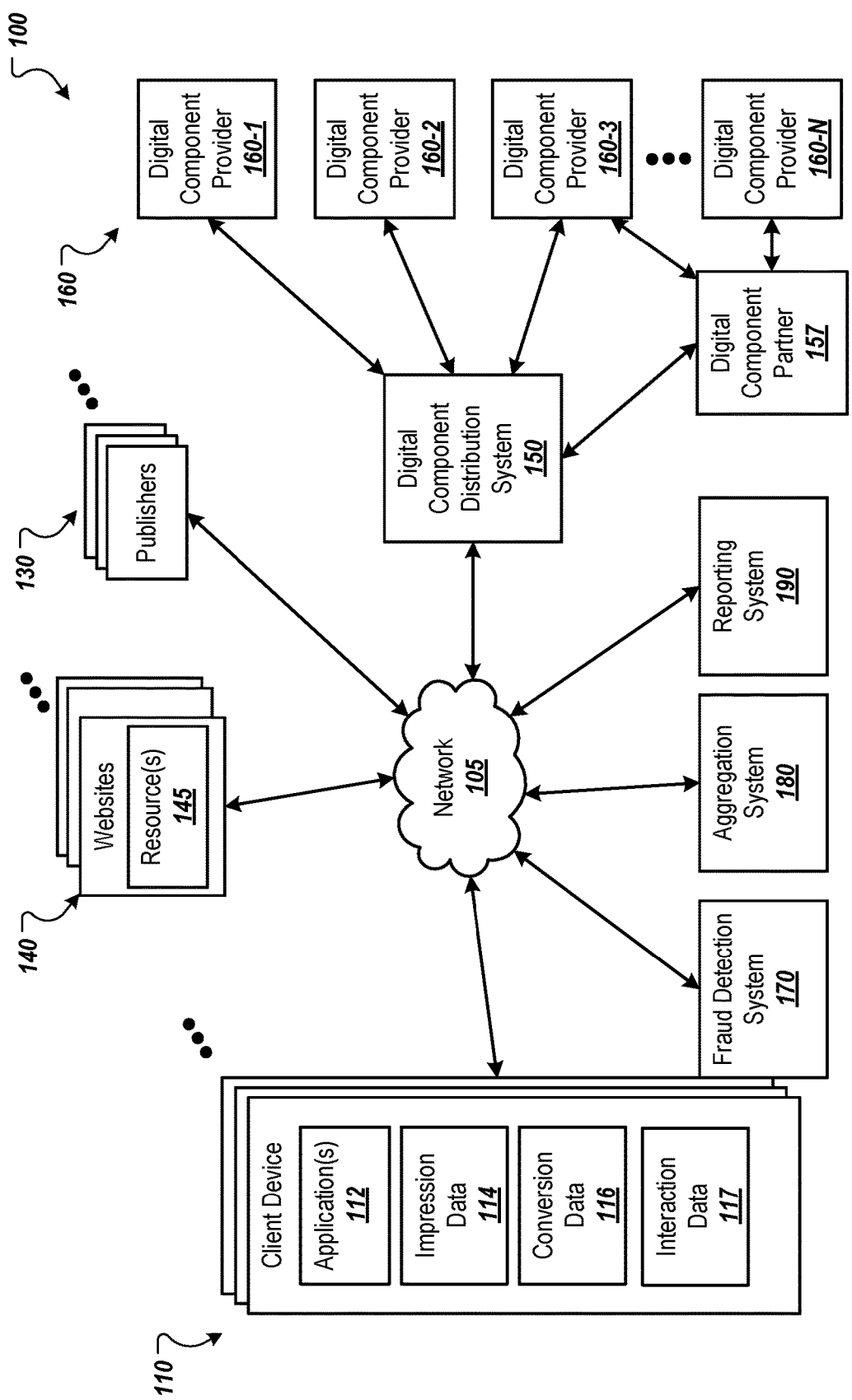
FIG. 1 is a block diagram of an environment in which a digital component system distributes digital components.

FIG. 1 is a block diagram of an environment 100 in which a digital component system 150 distributes digital components. The example environment 100 includes a data communication network 105, such as a local area network (LAN), a wide area network (WAN), the Internet, a mobile network, or a combination thereof. The network 105 connects client devices 110, publishers 130, websites 140, the digital component distribution system 150, a detection system 170, an aggregation system 180, and a reporting system 190. The example environment 100 may include many different client devices 110, publishers 130, and websites 140. In some implementations, the environment 100 can also include multiple digital component distribution systems 150.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105.

A client device 110 typically includes applications 112, such as web browsers and/or native applications, to facilitate the sending and receiving of data over the network 105. A native application is an application developed for a particular platform or a particular device. Publishers 130 can develop and provide, e.g., make available for download, native applications to the client devices 110. In some implementations, the client device 110 is a digital media device, e.g., a streaming device that plugs into a television or other display to stream videos to the television. The digital media device can also include a web browser and/or other applications that stream video and/or present resources.

A web browser can request a resource 145 from a web server that hosts a website 140 of a publisher 130, e.g., in response to the user of the client device 110 entering the resource address for the resource 145 in an address bar of the web browser or selecting a link that references the resource address. Similarly, a native application can request application content from a remote server of a publisher 130.

Some resources 145, application pages, or other application content can include digital component slots for presenting digital components with the resources 145 or application pages. As used throughout this document, the phrase "digital component" refers to a discrete unit of digital components or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components by the digital component distribution system 150 can thus supplement, and generally enhance, the web page or application content.

When the application 112 loads a resource 145 (or application content) that includes one or more digital component slots, the application 112 can request a digital component for each slot from the digital component distribution system 150. The digital component distribution system 150 can, in turn request digital components from digital component providers 160. The digital component providers 160 are entities that provide digital components for presentation with resources 145.

In some cases, the digital component distribution system 150 can also request digital components from one or more digital component partners 157. A digital component partner 157 is an entity that selects digital components 129 (not shown) on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 157, a digital component based on relatedness to the resource 145 (or application content), performance of the digital component (e.g., a rate at which users interact with the digital component), etc. The digital component distribution system 150 can then provide the selected digital component(s) to the client device 110 for presentation with the resource 145 or other application content.

When the application 112 presents a digital component, the application 112 (which could be a browser) can store impression data 114 for the presentation of the digital component. The impression data 114 for a particular presentation of a digital component can include a URL or domain of a landing page for the digital component (e.g., a page linked to by the digital component and when the user clicks or interacts with the digital component, the application/browser presents the page to the user). In some implementations, the impression data 114 for the particular presentation of the digital component can include a phone number, e.g., for click-to-call advertisements, or store addresses, e.g., for in-store visit advertisements.

The impression data 114 for the particular presentation of the digital component can further include one or more identifiers for the digital component, event-level data associated with the impression, an expiration time that specifies when the impression data is to be deleted from the client device 110, and/or a reporting URL or domain to which conversion reports for the digital component are to be sent. This data can be provided by the digital component, e.g., as metadata of the digital component or an anchor tag of the digital component. As described in more detail below, rather than storing, or in addition to storing, raw impression data for each impression of a digital component, the application 112 can store impression data that is blindly signed by the detection system 170.

The application 112 can also store conversion data 116 in response to a conversion being detected. A conversion for a digital component is the completion of a specified user action after the digital component is presented to and/or interacted with (e.g., clicked or tapped) by the user. The conversion data 116 for a conversion can include data that indicates a type of the conversion as some conversions can have multiple types. The type of a conversion can specify a subsequent action after the conversion is completed. For example, a conversion may be the addition of an item to an online shopping cart. In this example, a first type of conversion may be the addition of the item without checking out (e.g., not completing a purchase) and a second type of conversion may be checking out. Other examples of conversion include, phone call to the advertiser, installation of an application, a visit to a local store owned by the advertiser, or the like. As described in more detail below, the conversion data for a conversion can be a set of one or more bits that indicate the type of conversion and the application can store conversion data that is blindly signed by the digital component distribution system 150 (or another appropriate system).

In some implementations, a conversion for a digital component includes interaction data for a user interaction with a rendered element presented with the digital component. The interaction data 117 including a user interaction with the rendered element can include data that indicates a type of interaction, e.g., a click, swipe, finger-up/finger-down, etc., with the rendered element, e.g., a button. Interaction with rendered elements is described below in further detail with reference to FIGS. 2A-B and 3.

The detection system 170 can evaluate detection signals received from the client device 110 to determine whether an impression, interaction, and/or conversion is valid or invalid. The detection signals can be dependent on the application and can vary in different implementations. The application 112 (or the operating system on client device 110) can include an API that enables a digital component to make a call to the application 112 (or the operating system on client device 110) to collect the detection signals and provide the detection signals to the detection system 170.

In addition to the detection signals, the application 112 can send blinded impression data for the impression to the detection system 170. If the detection system 170 determines that the impression is valid (e.g., that identified content was actually presented by a client device), the detection system 170 can sign the blinded impression data and provide the signed blinded impression data to the application 112. Example techniques for generating blinded impression data and signing the blinded impression data are described below.

The aggregation system 180 can generate aggregated network measurements based on data received from client devices 110. In the following description, the techniques for generating and providing measurement data elements is described as being performed by the application 112, which can be a web browser or native application. However, in some implementations, the operating system of the client device 110 can generate and send the measurement data elements. In such implementations, the web browser(s) and application(s) on the client device 110 can be configured to report impressions and conversions to the operating system. The operating system can perform each of the operations for reporting the impressions and conversions described below as being performed by the application 112.

The application 112 on the client devices 110 can provide, to the aggregation system 180, measurement data elements that include encrypted data that represents network data. The network data can include impression data and/or conversion data for each conversion. For example, the application 112 can generate and send to the aggregation system 180, a measurement data element for each impression, user interaction, and/or conversion that takes place at the client device 110. The aggregated network measurements can include, for each of one or more digital components, a total number of impressions, user interactions, and/or conversions for the digital component and, optionally, a rendered element presented with the digital component, across multiple client devices 110.

The application 112 can use an (t, n) threshold scheme to generate the data in a measurement data element. In some implementations, when the application 112 detects a conversion or receives conversion data for a conversion, the application 112 generates a group key (e.g., a polynomial function) based on impression data and conversion data for the conversion. The application can then generate a group member key that represents a portion of the group key and that can be used to regenerate the group key only when a sufficient number of group member keys for the same impression and conversion pair are received. In this example, the measurement data element for a conversion can include the group member key generated by the application and a tag that corresponds to the impression and conversion pair. Each unique impression and conversion pair can have a corresponding unique tag so that the aggregation system 180 can aggregate the measurement data elements for each impression and conversion pair using its tag.

In some implementations, when the application 112 detects an interaction and/or conversion or receives interaction and/or conversion data for an interaction and/or conversion, the application 112 generates a group key (e.g., a polynomial function) based on impression data, interaction data, and conversion data for the interaction and/or conversion. The application can then generate a group member key that represents a portion of the group key and that can be used to regenerate the group key only when a sufficient number of group member keys for the same impression and interaction/conversion pair are received. In this example, the measurement data element for an interaction/conversion can include the group member key generated by the application and a tag that corresponds to the impression and interaction/conversion pair. Each unique impression and interaction/conversion pair can have a corresponding unique tag so that the aggregation system 180 can aggregate the measurement data elements for each impression and interaction/conversion pair using its tag.

In a (t, n)-threshold encryption scheme, the aggregation server 180 would need to receive at least t group member keys for the same impression and interaction/conversion pair to be able to decrypt the impression and conversion and/or interaction data. If less than t group member keys are received, the aggregation server 180 cannot decrypt the impression and conversion and/or interaction data. Once at least t measurement data elements for the same impression and conversion and/or interaction pair are received from client devices 110, the aggregation system 180 can determine the group key from the at least t group member keys and obtain the impression and conversion and/or interaction data from the group key.

The aggregation system 180 can determine the quantity of the conversions for an impression and conversion pair based on the number of measurement data elements received that includes impression data, interaction data, and/or conversion data for the impression and interaction/conversion pair. For example, after obtaining the impression, interaction, and conversion data using the at least t group member keys, the aggregation system 180 can determine, as the quantity of conversions, a count of the number of the group member keys received for the impression and interaction/conversion pair. The aggregation system 180 can report the impression data, the interaction data, the conversion data, and the quantity of the interactions and/or conversions to the reporting system 190, which may be implemented as a reporting domain that corresponds to a reporting URL of the digital component that, in turn, corresponds to the impression and conversion data.

False Rendered Element Reporting and Validation

Digital component system 150 can distribute digital components from various digital component providers 160 to client devices 110. Digital components can include rendered elements e.g., buttons, where users can interact with the rendered elements. Rendered elements can be validated using declarations of appearance and screenshots captured of the appearance of the rendered element in the active window of the client device 110. Furthermore, interactions with the rendered elements can be verified and aggregated in order to protect the privacy of the reporting end-user as well as preserving the interests of the digital component providers 160.

Figure 2A:
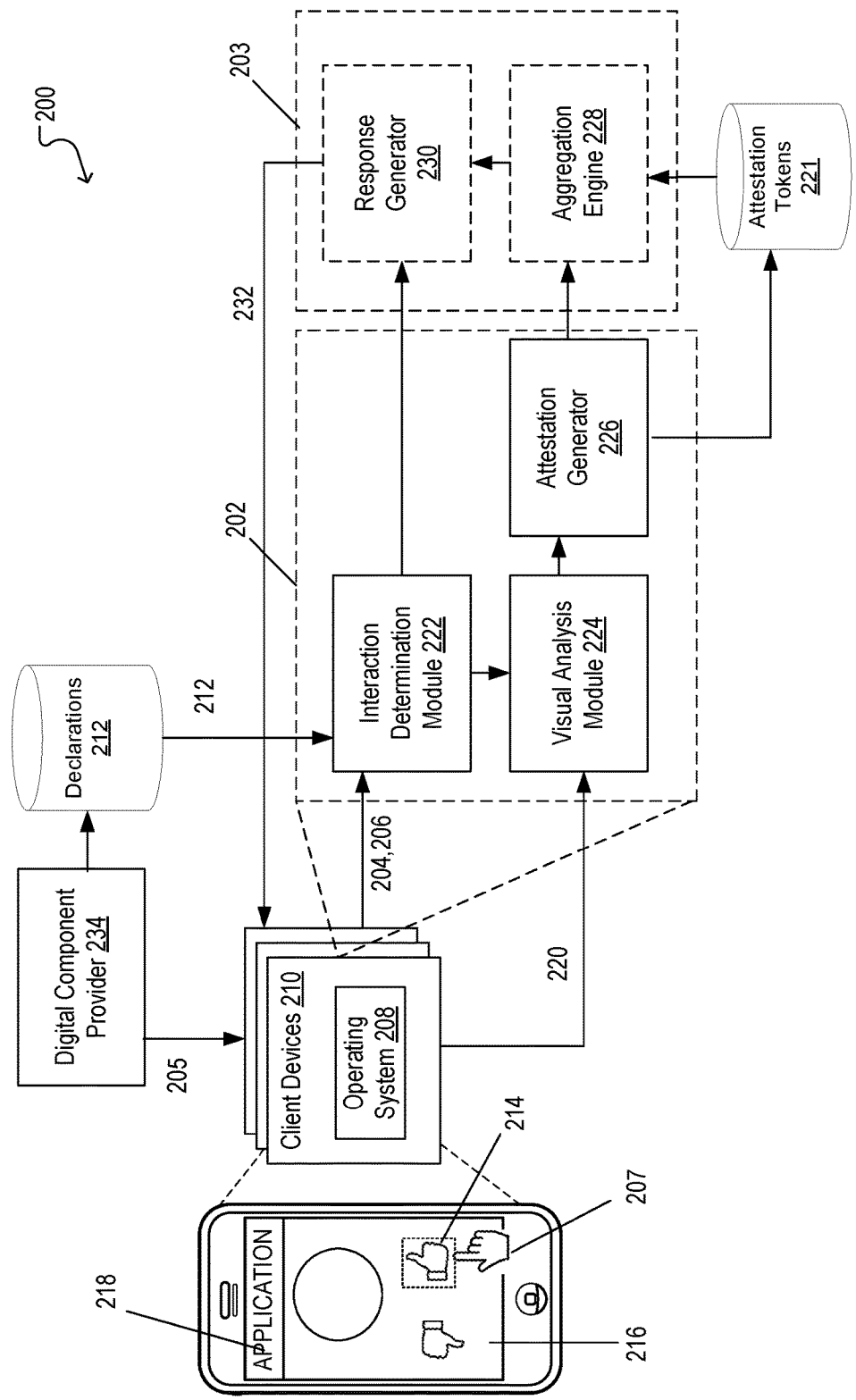
FIGS. 2A and 2B are a block diagrams of environments in which rendered element interactions are validated.
Figure 2B:
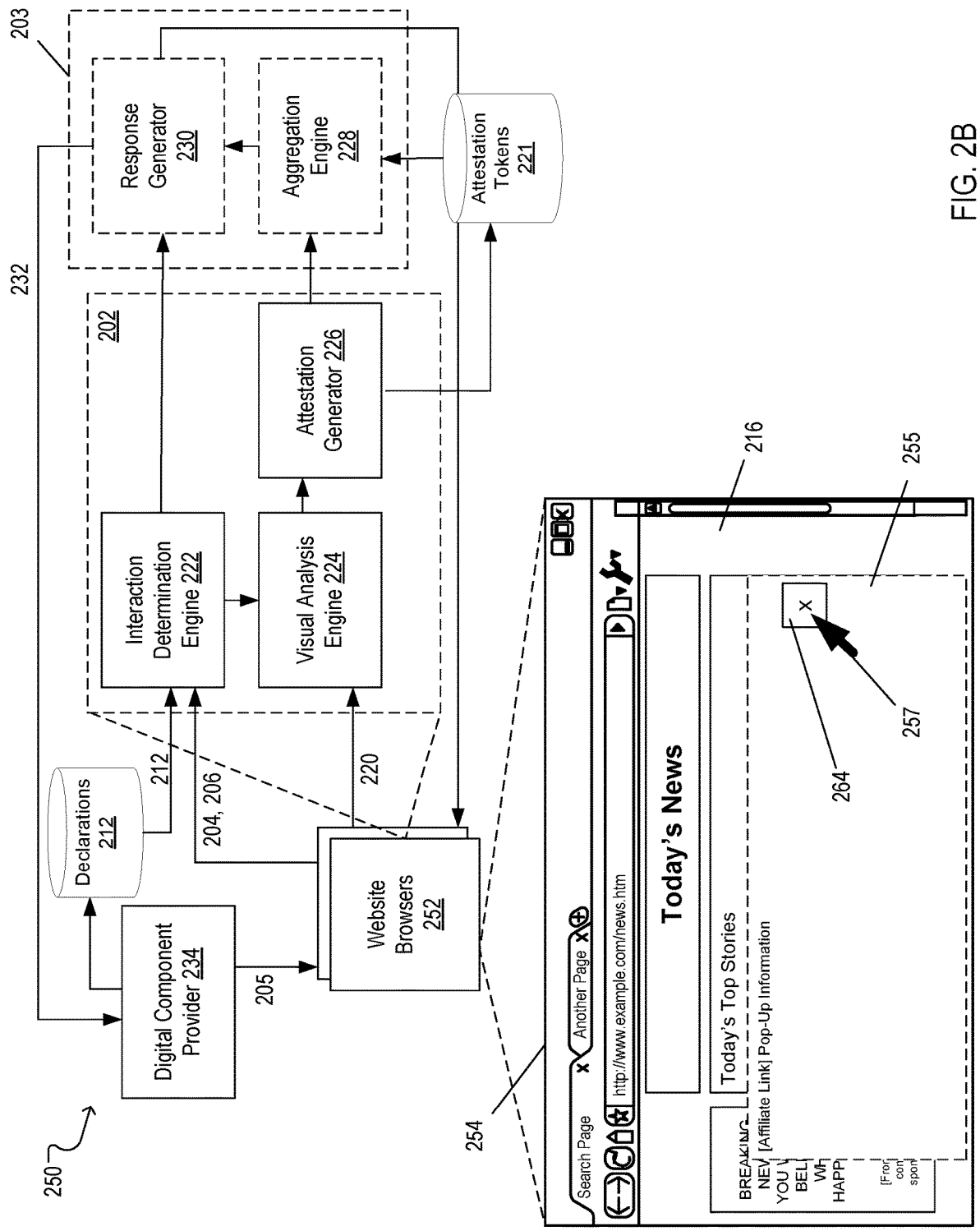

FIGS. 2A and 2B are block diagrams of environments in which rendered element interactions are validated. A false rendered element refers to a rendered element, e.g., a button or otherwise selectable feature, presented with a digital component that is invisible or misleading to a user. In some implementations, a false rendered element can trigger an interaction that is not intended by the user. In one example, a hidden button (e.g., a code-defined interaction zone for the button that does not include a graphical visualization of the button presented on screen) over a "close window" button can launch a request for another application or webpage instead of closing the current window or application, as intended by the user by the user's selection of the "close window" button. In another example, a misleading rendered element can appear as a "thumbs up" icon but a user selection of the misleading rendered element can trigger a "down vote" function rather than the intended "up vote" function.

FIG. 2A is a block diagram of an environment 200 in which rendered element interactions are validated. Interaction validation system 202 is configured to receive a rendering notification 204 and an interaction alert 206 from an operating system 208 on a client device 210. Interaction validation system 202 is further configured to receive a declaration 212 of a verified appearance of a rendered element 214 in an active window 216 of an application 218. Additionally, interaction validation system 202 is configured to receive, from the operating system 208 or another trusted application 218 of the client device 210, a screenshot 220 of the active window 216 displayed on the client device 210.

In some implementations, one or more of the processes described herein as performed by the interaction validation system 202 can be performed by the operating system 208 or another trusted application 218 on the client device 210.

Interaction validation system 202 can include an interaction determination module 222, a visual analysis module 224, and an attestation generator 226. Each of the interaction determination module 222, visual analysis module 224, and attestation generator 226 can include computer storage readable media encoded with the functionality to perform the tasks described herein with reference to the respective module and/or one or more processors configured to perform the tasks described. Interaction determination module 222 is configured to receive a rendering notification 204 and an interaction alert 206 as input. Rendering notification 204 can include a location of the rendered element 214 in the active window 216, a stable identification (stable ID) and/or uniform resource identifier (URI) of the rendered element 214, and a site or domain that rendered the rendered element 214.

A rendered element 214 is an element that is visible in an active window 216, e.g., an active window on a client device 210. A rendering notification 204 can be generated by an application notifying the operating system 208 that a rendered element 214 is visible in the active window 216. In another embodiment, rendering notification 204 can be generated by a webpage/JavaScript notifying the web browser that the rendered element 214 is visible in the active window of a web page, e.g., as described with reference to FIG. 2B below.

Rendered elements 214 can be requested by the operating system 208 as a part of, or in addition to, a request for digital component 205. The request for digital components can include a rendered element 214, e.g., a news post with share, vote up, and vote down buttons. The digital component provider 234 can provide a schema for generating the rendered element 214 and rendering control including a digital signature for the rendered element 214.

A rendering notification 204 can be generated each time the appearance of the active window changes, e.g., by the user scrolling, resizing, or otherwise changing a current view of the active window. Tracking a location of the rendered element 214 within the active window 216 can include tracking user scrolling, zoom functionality, etc., where user interaction with scrolling functionality, zoom functionality, etc., will trigger a signal to update the rendering notification 204. In some implementations, the rendering notification can be generated by a script, such as a mutation observer, or another script that can detect changes to a user interface (e.g., a DOM of a web page or a structure of a native application user interface).

Referring back to FIG. 2A, an interaction 207 with a rendered element 214 can include but is not limited to a user selection, e.g., a click, swipe, pinch, mouse hover, or other motion indicating a selection of the rendered element within an area declared to be occupied by the rendered element 214. Interaction 207 can be a user scrolling through at least a portion of a digital component 205, e.g., scrolling to a bottom of a news article. Interaction 207 can be a user passively allowing playback of a digital component 205, e.g., playback of an audio, video, or multi-media file. In one example, an interaction 207 is detected when a user's finger touches down on and/or lifts up from a touchscreen of a client device 210.

Additionally, the interaction determination module 222 receives declaration 212. Receiving the declaration 212 of the rendered element 214 can include receiving a verified appearance of the rendered element 214. A verified appearance of the rendered element 214 can include a unique stable ID, e.g., a cryptohash of a resource file, or a cryptohash of rendered RGB pixel values, and/or stable URI, and a verified shape of the rendered element 214. In one example, a verified shape includes dimensions and a type of shape, e.g., square, rectangle, circle, etc. In another example, a verified shape includes a range of dimensions and a general category and/or descriptive identifiers of the shape, e.g., a thumbs up shape, a stop sign shape, a checked box shape. In another example, the verified shape may be represented by a bitmap (2D array), where 1 represents "part of shape" and 0 otherwise. Such a bitmap can represent an arbitrary complex shape. Declaration 212 is not a user specific, e.g., not specific to a particular user or particular client device 210. The declared appearance of the rendered element 214 is consistent for a sufficiently large group of users on various client devices. For example, the declared appearance includes ranges of dimensions and color palette to accommodate variations that are possible between different client devices, display characteristics, and user preferences. In another example, the declared appearance includes multiple languages and other region variations possible for the rendered element 214.

Declaration 212 including a declared appearance of the rendered element is independently verified by a third-party as not misleading. In one example, rendered elements in an application can be verified by an application store or other provider that lists the application, for example, as a part of a review and approval process for providing the application. In another example, rendered elements in a web resource can be verified by a web browser vendor and/or privacy group for website publishers.

Third-party reviewers can determine that the rendered buttons satisfy a review criterion, e.g., that an interaction with a rendered button results in an action matching a user intent, and digitally sign the rendered element resource, e.g., a png or bitmap file, that can be used to verify the rendered element. The user intent may therefore correspond to an action conveyed by the appearance of the rendered element. In some implementations, third-party reviewers can generate an enabled list of approved appearances that a web browser can access.

Interaction determination module 222, determines, based on the received declaration 212, whether the interaction 207 of the interaction alert 206 occurred at a declared location of the rendered element 214 within the active window 216 of the client device 210. Detecting the interaction 207 has occurred at a declared location of the rendered element 214 can include receiving, from the operating system 208 or other trusted application 218, a selection signal specifying an XY coordinate of a user click or other form of user interaction with the rendered element 214 within the active window 216. In some implementations, detecting the interaction 207 at the declared location of the rendered element includes receiving a range of X'-X" and a range of Y'-Y" coordinates for the declared area occupied by rendered element in the active window 216, comparing the X coordinate of the interaction 207 and the Y coordinate of the interaction 207 to the ranges of X'-X" and Y'-Y", and determining whether the X coordinate of the interaction 207 and the Y coordinate of the interaction 207 are within the ranges of X'-X" and Y'-Y", respectively.

Based on the determination that the interaction 207 occurred at a declared location of the rendered element 214 within the active window 216, the interaction determination module 222 provides a confirmation of interaction as output to the visual analysis module 224. In one example, for an application 218, the operating system 208 will determine that the interaction 207 occurred at the declared location of the rendered element by examining whether the interaction 207 occurred within an area declared to be occupied by the rendered element 214. In another example, as depicted in FIG. 2B, for a web resource 254, the browser 252 will examine whether the interaction 257 occurred within an area declared to be occupied by the rendered element 264.

The visual analysis module 224 is configured to receive as input, from the operating system 208, a screenshot 220 of the active window of the client device 210 including the rendered element 214. Additionally, the visual analysis module 224 is configured to receive as input a declaration of the rendered element 214 from a repository of declarations 212 for rendered elements. The visual analysis module 224 verifies a visual appearance of the rendered element 214 in the screenshot 220 with a declared appearance of the rendered element 214 from declaration 212 of the rendered element 214.

In some implementations, verifying the visual appearance of the rendered element includes utilizing one or more image matching algorithms to compare the declared appearance to the screenshot 220. For example, the image matching algorithms can extract image features (e.g., pixel data) of the rendered element, identify a stored set of image features corresponding to the rendered element (e.g., as previously declared by a publisher of the rendered element), and compare the extracted image features to the stored image features to determine whether there is a match between the extracted image features and the stored image features. When verifying the visual appearance of the rendered element, variations due to rendering difference, e.g., due to scaling, screen hue/brightness/contrast adjustment, font used to render the element text, etc., can be accounted for. For example, when comparing the screenshot 220 against the declaration 212 for the rendered element 214, an image matching algorithm can allow for small variations in rendering with algorithms to normalize size, contrast, brightness, etc., by using, for example, variants of a two-dimensional normalized cross correlation algorithm or another appropriate algorithm.

In some implementations, a declaration 212 can include "true" rendering values that are not subject to hue masks, aspect skewing, or other similar rendering changes that can occur when an element is rendered on a particular client device or web resource. In this embodiment, the operating system and/or browser can utilize the declaration 212 without necessarily accounting for any small variations in rendering. In one example, an operating system can have rendering architecture including a device-independent bitmap.

In some implementations, verification of the visual appearance of the rendered element 214 and the declared appearance of the rendered element includes meeting a threshold of similarity, e.g., rendered appearance of the rendered element is within a range of variability from the declared appearance of the rendered element.

Based on the verification that the visual appearance of the rendered element 214 is matching and/or within a threshold of similarity, the visual analysis module 224 provides a verification of interaction as output to the attestation generator 226.

The attestation generator 226 is configured to receive the verification of the visual appearance and information about the interaction with the rendered element 214 as input, and generate, as output, the interaction attestation token 221. Interaction attestation token 221 can include a stable ID and/or URI of the declared appearance, a timestamp of the interaction 207, a trust token (e.g., a device integrity token for the operating system or a signed redemption record (SRR) for a web browser), a digital signature generated by the client device 210 to verify the integrity of the interaction attestation token (e.g., to verify a trusted device generated the attestation token), XY coordinates of where the interaction occurred within the active window, a client device public key, and an unfalsifiable digital signature created by the operating system or web browser (e.g., to prove the authenticity of the interaction attestation token).

In some implementations, the stable ID and/or URI of the appearance of the rendered element included in the attestation token conveys a real intention of the user's interaction with the rendered element. For example, if the URI points to a "thumbs up" icon for a digital component (e.g., video content), the attestation token attests that the user really clicked on the "thumbs up" button to up-vote the video content. Based on the actual intent attested by the attestation token, the digital content provider 234 can act accordingly, e.g., increase the "thumbs up" count.

In some implementations, the user intent corresponds to an action conveyed by the appearance of the rendered element. A report of user interaction can be modified based on the real intention of the user's interaction included in the attestation token. In other words, the report can be modified based on the actual appearance of the rendered element, with which the user believed they interacted. For example, the server can prevent the incrementation of a "vote up" count in response to the rendered element in the attestation token conveying a "vote down" user intention. This can prevent the propagation of false or misleading information and can improve the user's future experience.

In the scenario where the interaction determination module 222 and/or the visual analysis module determine that the interaction did not occur at the declared location of the rendered element, the system 202 refrains from generating the interaction attestation token 221 for the interaction 207 with the rendered element 214.

The generated attestation tokens 221 can be provided to an interaction validation server 203 and stored for further use in aggregation of interactions with rendered elements 214 of digital components 205. The interaction validation server 203 can include an aggregation engine 228 and a response generator 230. Server 203 can receive, as input, attestation tokens 221. The aggregation engine 228 can aggregate the interaction attestations for multiple interactions with multiple instantiations of the rendered element 124, e.g., multiple validated presentations/interactions with the rendered element 214 on multiple client devices 210 by multiple users.

In some implementations, the system 202 can pair together an interaction attestation token 221 for a "finger down" interaction of a user on a touchscreen with an interaction attestation token 221 for a "finger up" interaction of the user on the touchscreen, e.g., sequential interactions, and provide the pair of interaction attestation tokens 221 to the digital component provider 234 or another interested third-party. The two interaction attestation tokens can be paired based in part on having the stable ID and/or URI of the declared appearance of the rendered element, the device public key, and the token creation timestamp included in both attestation tokens to prevent user fraud or misinformation.

The response generator 230 can receive interaction attestation tokens 221 and false interaction responses and provide, as output, false rendered element responses 232. The false rendered element responses 232 can be provided, for example, to the client devices 210 and/or digital component providers 234 of the digital components 205.

In some implementations, in response to determining that the interaction 207 did not occur at the declared location of the rendered element 214, the interaction validation system 202 can trigger a false interaction response. A false interaction response can be provided to server 203. Aggregation engine 228 can validate the false interaction responses using attestation tokens for the digital component 205, e.g., impression data 114 and click conversion attestation 116, as well as interaction attestation tokens 221 for the rendered element. The aggregation engine 228 can aggregate the validated false interaction responses to maintain user privacy of the users triggering the false interaction responses. A rendered element can be reported as a false rendered element when a threshold portion of users who interact with the rendered element flag it as a false rendered element. Reporting of the false rendered element can be provided to content providers, publishers, and end-users. The distribution of digital components including the false rendered elements can be limited, modified, or halted as result. Digital component provider 234 may consider devices 210 or application 218 as untrustworthy, if they have excessive amounts of false rendered elements. Digital component provider may block or otherwise limit the serving of content to those devices or applications.

In some implementations, the processes performed by the interaction determination module 222, visual analysis module 224, attestation generator 226, and optionally the aggregation engine 228 and response generator 230 can be performed by more or fewer modules, and each module can include one or more processors.

In some implementations, the methods and systems described with reference to FIG. 2A in terms of an operating system 208 and application 218 can be performed, for example, by a web browser. FIG. 2B is a block diagram of another environment 250 in which false rendered element interactions are validated. As depicted in FIG. 2B, interaction validation system 202 is configured to receive a rendering notification 204 and an interaction alert 206 from a web browser 252. Interaction validation system 202 is further configured to receive a declaration 212 of a verified appearance of a rendered element 214 in an active window 216 of a web resource 254. Additionally, interaction validation system 202 is configured to receive, from the web browser 252, a screenshot 220 of the active window 216 displayed of the web resource 254.

As depicted in FIG. 2B, an interaction 257 with a rendered element 264 is a user interaction or selection, e.g., using a mouse click, of a "close window" rendered element 264 for a digital component 255, e.g., a pop-up window. The rendered element 264 depicted in FIG. 2B can be a false rendered element, where an action associated with the user interaction, e.g., click, with the false rendered element is different than a user intent. For example, the user intent for the interaction 257 with rendered element 264 is to close the digital component 255, e.g., close the pop-up window. However, instead of closing the digital component 255, the interaction with rendered element 264 results in a redirect to a new landing page, or counted as a click on an ad, which is a typical type of ad fraud.

In some implementations, in response to determining that an interaction 257 is with a false rendered element, a false interaction response can be triggered. In response to a false interaction response being triggered, the server can intercept a pathway of the client device to prevent the user from reaching a new landing page as a result of the false rendered element. For example, the server can intercept the pathway by preventing the redirection to the new landing page. This reduces the usage of resources and processing in rendering a landing page to which a false rendered element redirects.

Figure 3:
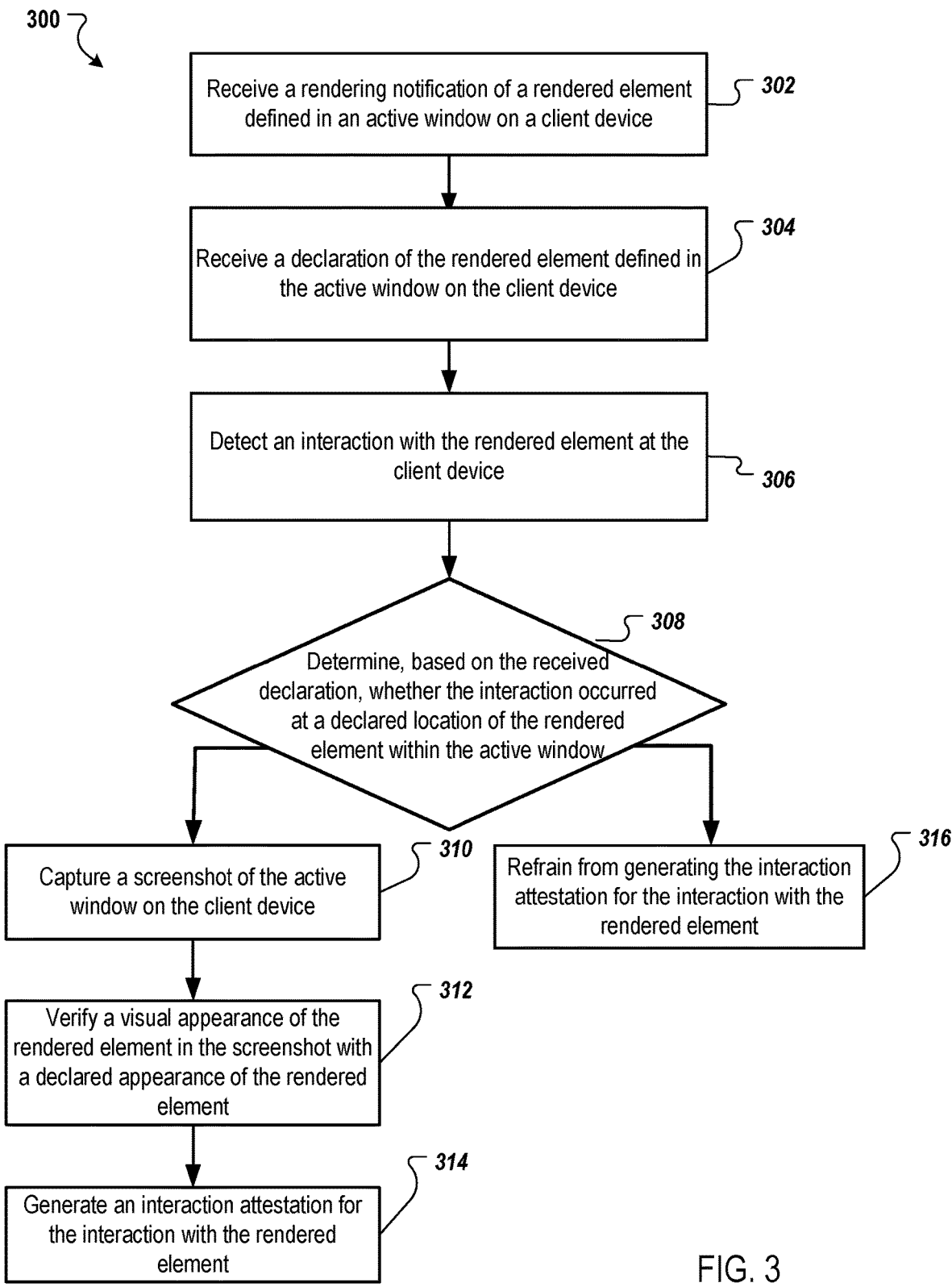
FIG. 3 is a flow diagram that illustrates an example process for validating interactions with rendered elements.

FIG. 3 is a flow diagram that illustrates an example process 300 for validating interactions with rendered elements. Process 300 for validating interactions with rendered elements can be performed by an operating system 208 or another trusted application 218 as depicted by FIG. 2A, and/or can be performed by a web browser 252 as depicted by FIG. 2B.

A rendering notification is received of a rendered element defined in an active window on a client device (302). A rendering notification 204 is received by system 202 from an application 218 or web resource 254. In some implementations, the operating system 208 and/or another trusted application or web browser 252 can receive the rendering notification from an application 218 or web resource 254, respectively. Rendering notification 204 includes information, e.g., a location of the element rendered in the active window, a stable ID and a URI of the rendered element, and a site or domain that called the element, about the rendered element 214, 264 that is visible in an active window 216 of the client device or website. Rendered element 214, 264 can be an element that is presented with a digital component 205 on the client device 210.

A declaration of the rendered element defined in the active window on the client device is received (304). Declaration 212 can be received from a repository of declarations 212 that are verified by a third-party. Declaration of the rendered element can be requested by the operating system 208 or web browser 252 in response to receiving the rendering notification of the rendered element being visible in the active window of the client device or webpage.

An interaction with the rendered element at the client device is detected (306). The interaction can be detected, for example, by the operating system 208 of the client device 210 or the web browser 252. An interaction 207 with the rendered element 214 can be, for example, a user's finger touch down on a touchscreen or lift up from the touchscreen on the client device 210. In another example, an interaction 257 with a rendered element 264 can be a mouse click within the active window 216 of the web resource 254.

Based on the received declaration, it is determined whether the interaction occurred at a declared location of the rendered element within the active window (308). In the embodiment depicted in FIG. 2A, the operating system 208 will examine whether the interaction 207, e.g., click, occurred within an area declared to be occupied by a rendered element. Detecting the interaction 207 has occurred at a declared location of the rendered element 214 can include receiving, from the operating system 208 or other trusted application 218, a selection signal specifying an XY coordinate of a user click or other form of user interaction with the rendered element 214 within the active window 216. In some implementations, detecting the interaction 207 at the declared location of the rendered element includes receiving a range of X'-X" and a range of Y'-Y" coordinates for the declared area occupied by rendered element in the active window 216, comparing the X coordinate of the interaction 207 and the Y coordinate of the interaction 207 to the ranges of X'-X" and Y'-Y", and determining whether the X coordinate of the interaction 207 and the Y coordinate of the interaction 207 are within the ranges of X'-X" and Y'-Y", respectively. In the embodiment depicted in FIG. 2B, the web browser 252 will examine whether the interaction 257 occurred within an area declared to be occupied by a rendered element 264.

For a determination that the interaction did occur at the declared location of the rendered element within the active window, a screenshot of the active window on the client device is captured (310). Before notifying the application 218 or web resource 254 that the rendered element 214, 264 may be malicious, the operating system 208 or web browser 252 can capture a screenshot 220 of the active window 216. The screenshot can be captured, for example, by generating a signal that triggers activation of a screenshot function (e.g., of a camera application installed on the device). The generated signal can be passed to the camera application, which causes the camera application to capture the screenshot of the active window on the client device. In some implementations, the device operating system can perform the screen capture operation directly by copying the display frame buffer. The captured screenshot can then be made available for evaluation by one or more other applications installed on the client device and/or server implemented functions.

A visual appearance of the rendered element in the screenshot is verified with a declared appearance of the rendered element (312). The operating system 208 or web browser 252 will compare the screenshot 220 against the declared appearance of the rendered element 214, 264 from the declaration 212. The comparison can be, for example, a pixel by pixel comparison or another comparison (e.g., block or feature based comparison). If there is a match between the appearance of the rendered element 214, 264 in the screenshot 220 and the declared appearance of the declaration 212 for the rendered element 214,264, then the operating system 208 or web browser 252 will generate an interaction attestation 221 for the interaction with the rendered element (314). The interaction attestation token 221 can include information about the interaction 207, 257, as described in more detail above with reference to FIG. 2A.

In some implementations, the application 218 or web resource 254 that rendered the rendered element 214, 264, respectively, can pair the interaction attestation token 221 for a "finger down" with a "finger up" interaction for a same rendered element 214, 264 and provide the paired interaction attestation tokens 221 to a digital component provider 234 or other interested parties for measurement, auditing, or other report-based actions.

For a determination that the interaction did not occur at the declared location of the rendered element within the active window, the system refrains from generating the interaction attestation for the interaction with the rendered element (316). In some implementations, a false rendered element response is generated by the operating system 208 or web browser 252 and can be provided to server 203 informing the server 203 that the application 218 or web resource 254 that rendered element 214, 264, or that claimed that user had interacted with the rendered element, may be malicious.

Figure 4:
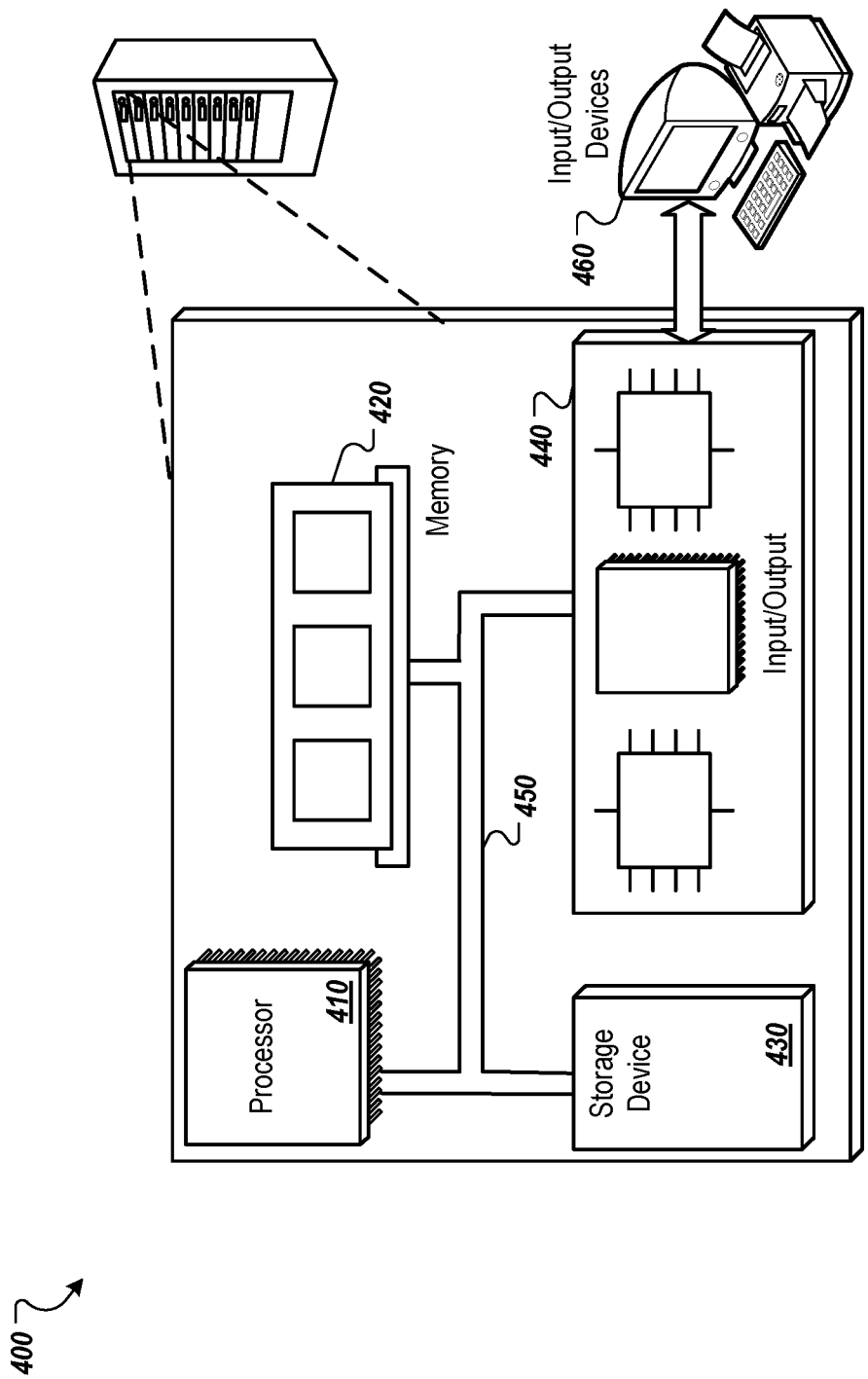
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A user may be provided with controls allowing the user to make an election as to both if and when systems, programs, or features described herein may enable collection of user information (e.g., information about a user's social network, social actions, or activities, profession, a user's preferences, or a user's current location), and if the user is sent personalized content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, the information retention policy, and what information is provided to the user.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    detecting a first interaction with a rendered element that was rendered at a first client device;
    determining that the first interaction occurred at a declared location of the rendered element at the first client device; and
    in response to determining that the first interaction occurred at the declared location of the rendered element:
        capturing a screenshot of a first active interface of the first client device;
        verifying a visual appearance of the rendered element in the screenshot with a declared appearance of the rendered element; and
        generating an interaction attestation for the first interaction with the rendered element, thereby validating the first interaction;
    detecting a second interaction with the rendered element that was rendered at a second client device;
    determining that the second interaction with the rendered element did not occur at the declared location of the rendered element;
    in response to determining that the second interaction did not occur at the declared location of the rendered element, refraining from generating the interaction attestation for the second interaction with the rendered element.

2. The method of claim 1, further comprising receiving a verified appearance of the rendered element.

3. The method of claim 2, wherein the verified appearance includes a unique stable identifier (ID) and/or stable uniform resource identifier (URI) and a verified shape.

4. The method of claim 1, wherein verifying a visual appearance of the rendered element in the screenshot with a declared appearance of the rendered element comprises utilizing an image matching algorithm.

5. The method of claim 1, wherein detecting the first interaction comprises receiving a selection signal specifying an XY coordinate of a user click within an active window.

6. The method of claim 1, further comprising aggregating interaction attestations for a plurality of interactions with a plurality of instantiations of the rendered element.

7. The method of claim 1, wherein generating the interaction attestation comprises generating one or more of i) a stable identifier (ID) and/or uniform resource identifier (URI) of the declared appearance, ii) a timestamp of the first interaction, iii) a device integrity token, iv) a digital signature by the first client device, v) XY coordinates of the first interaction, and/or vi) a client device public key.

8. The method of claim 7, wherein the stable ID and/or URI of the declared appearance includes a user intent of the first interaction.

9. The method of claim 8, wherein the user intent corresponds to an action conveyed by the visual appearance of the rendered element.

10. The method of claim 8, further comprising:
    in response to the interaction attestation including a user intent, modifying a report of the interaction based on the user intent.

11. The method of claim 8, further comprising:
    in response to determining that the first interaction is different than the user intent, determining that the rendered element is a false rendered element and triggering a false interaction response.

12. The method of claim 11, further comprising:
    in response to triggering the false interaction response, intercepting a pathway of the first client device to a landing page of the false rendered element.

13. The method of claim 1, further comprising:
    in response to determining that the second interaction did not occur at the declared location of the rendered element, triggering a false interaction response.

14. A non-transitory computer storage medium encoded with a computer program, the computer program comprising instructions that when executed by a data processing apparatus cause the data processing apparatus to perform operations comprising:
    detecting a first interaction with a rendered element that was rendered at a first client device;
        determining that the first interaction occurred at a declared location of the rendered element at the first client device; and
        in response to determining that the first interaction occurred at the declared location of the rendered element:
            capturing a screenshot of a first active interface of the first client device;
            verifying a visual appearance of the rendered element in the screenshot with a declared appearance of the rendered element; and generating an interaction attestation for the first interaction with the rendered element, thereby validating the first interaction;

detecting a second interaction with the rendered element that was rendered at a second client device;

determining that the second interaction with the rendered element did not occur at the declared location of the rendered element;

in response to determining that the second interaction did not occur at the declared location of the rendered element, refraining from generating the interaction attestation for the second interaction with the rendered element.

15. The non-transitory computer storage medium of claim 14, wherein the instructions cause the data processing apparatus to perform operations further comprising receiving a verified appearance of the rendered element.

16. The non-transitory computer storage medium of claim 15, wherein the verified appearance includes a unique stable identifier (ID) and/or stable uniform resource identifier (URI) and a verified shape.

17. The non-transitory computer storage medium of claim 14, wherein verifying a visual appearance of the rendered element in the screenshot with a declared appearance of the rendered element comprises utilizing an image matching algorithm.

18. The non-transitory computer storage medium of claim 14, wherein detecting the first interaction comprises receiving a selection signal specifying an XY coordinate of a user click within an active window.

19. The non-transitory computer storage medium of claim 14, wherein the instructions cause the data processing apparatus to perform operations further comprising aggregating interaction attestations for a plurality of interactions with a plurality of instantiations of the rendered element.

20. The non-transitory computer storage medium of claim 14, wherein generating the interaction attestation comprises generating one or more of i) a stable identifier (ID) and/or uniform resource identifier (URI) of the declared appearance, ii) a timestamp of the first interaction, iii) a device integrity token, iv) a digital signature by the first client device, v) XY coordinates of the first interaction, and/or vi) a client device public key.

* * * * *